US009246945B2

(12) United States Patent
Chari et al.

(10) Patent No.: US 9,246,945 B2
(45) Date of Patent: Jan. 26, 2016

(54) TECHNIQUES FOR RECONCILING PERMISSION USAGE WITH SECURITY POLICY FOR POLICY OPTIMIZATION AND MONITORING CONTINUOUS COMPLIANCE

(71) Applicant: International Business Machines Corporation, Armonk, NY (US)

(72) Inventors: Suresh N. Chari, Tarrytown, NY (US); Ian M. Molloy, Chappaqua, NY (US); Youngja Park, Princeton, NJ (US); Wilfried Teiken, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 13/904,350

(22) Filed: May 29, 2013

(65) Prior Publication Data
US 2014/0359692 A1 Dec. 4, 2014

(51) Int. Cl.
G06F 21/00 (2013.01)
H04L 29/06 (2006.01)
G06F 21/31 (2013.01)
G06F 21/60 (2013.01)

(52) U.S. Cl.
CPC .............. *H04L 63/20* (2013.01); *G06F 21/31* (2013.01); *G06F 21/604* (2013.01); *G06F 2221/2101* (2013.01)

(58) Field of Classification Search
USPC .......................................... 726/1, 4
See application file for complete search history.

(56) References Cited

U.S. PATENT DOCUMENTS

| 7,526,785 | B1 | 4/2009 | Pearson et al. |
| 8,209,742 | B2 | 6/2012 | Schreiber et al. |
| 2002/0026592 | A1 | 2/2002 | Gavrila et al. |
| 2008/0091681 | A1* | 4/2008 | Dwivedi et al. ............... 707/9 |
| 2009/0222894 | A1* | 9/2009 | Kenny et al. .................. 726/4 |
| 2009/0300711 | A1 | 12/2009 | Tokutani et al. |
| 2011/0209196 | A1* | 8/2011 | Kennedy ....................... 726/1 |
| 2012/0023576 | A1* | 1/2012 | Sorensen et al. ............. 726/22 |
| 2012/0216243 | A1* | 8/2012 | Gill et al. ..................... 726/1 |
| 2012/0246098 | A1 | 9/2012 | Chari et al. |
| 2013/0254833 | A1* | 9/2013 | Nicodemus et al. .......... 726/1 |
| 2013/0283339 | A1* | 10/2013 | Biswas et al. ................. 726/1 |

OTHER PUBLICATIONS

"Taint-Enhanced Policy Enforcement: A Practical Approach to Defeat a Wide Range of Attacks"; Xu et al; 15th USENIX Security Symposium; 2006; pp. 121-136 of the Proceedings.*

(Continued)

*Primary Examiner* — Jason Lee
(74) *Attorney, Agent, or Firm* — Jeff LaBaw; Michael J. Chang, LLC

(57) ABSTRACT

In one aspect, a method for managing a security policy having multiple policy items includes the steps of: (a) mapping permissions to the policy items which apply to usage of the permissions so as to determine which of the permissions are granted to groups of users by each of the policy items; (b) identifying at least one of the policy items mapped in step (a) that is in violation of least privilege based on a comparison of an actual permission usage with the security policy; (c) identifying at least one of the policy items mapped in step (a) that increases operational risk; (d) verifying that policy constructs in the security policy are consistent with policy constructs inferred from the actual permission usage; and (e) identifying optimizations of the security policy based on output from one or more of steps (a)-(d).

25 Claims, 7 Drawing Sheets

(56) References Cited

OTHER PUBLICATIONS

J.H. Seltzer et al., "The Protection of Information in Computer Systems," Proceedings of the IEEE, 63(9):1278-1308 (Sep. 1975).

Bishop et al., "We have Met the Enemy and He is Us," NSPW '08: Proceedings of the 2008 workshop on New Security paradigms (Sep. 2008).

M. Frank et al., "A probabilistic approach to hybrid role mining," CCS '09 (Nov. 2009).

Molloy et al., "Generative Models for Access Control Policies: Applications to Role Mining Over Logs with Attribution," Proceedings of the 17th ACM Symposium on Access Control Models and Technologies, SACMAT '12 (Jun. 2012).

D. Blei et al., "Latent Dirichlet Allocation," Journal of Machine Learning Research 3, pp. 993-1022 (Jan. 2003).

McDaniel et al., "Securing Distributed Applications Using a Policy-based Approach," Ann Arbor, 48109-2122 (Dec. 2003).

Chen et al., "Data Mining and Service Rating in Service-Oriented Architectures to Improve Information Sharing," 2005 IEEE Aerospace Conference, (Mar. 2005).

Molloy, "Automatic Migration to Role-Based Access Control," CERIAS Tech Report 2010-34, Purdue University Thesis Dissertation/Acceptance (Aug. 2010).

Ene et al., "Fast Exact and Heuristic Methods for Role Minimization Problems," SACMAT '08 Proceedings of the 13th ACM symposium on Access control models and technologies pp. 1-10 (Jun. 2008).

Harrison et al., "Protection in Operating Systems," Communications of the ACM, vol. 19, No. 8 (Aug. 1976).

Li et al., "Access Control Policy Combining: Theory Meets Practice," Proceedings of the 14th ACM symposium on Access control models and technologies SACMAT '09 (Jun. 2009).

Schneider, "Least Privilege and More," IEEE Security & Privacy, vol. 1, Issue 5 (Sep. 2003).

* cited by examiner

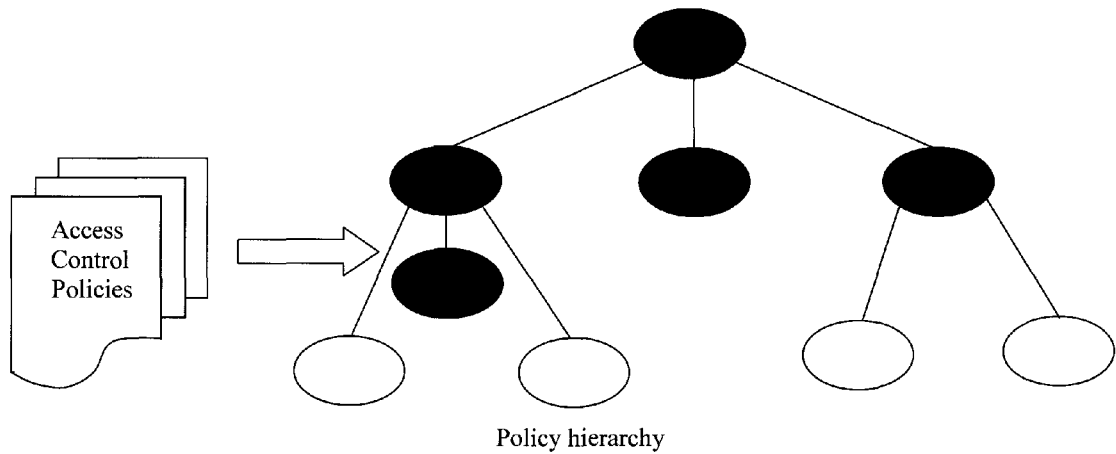

Policy hierarchy

FIG. 3

Identify redundant policy assignments
Identify overprovisioning
    -overprovisioned policies
    -overprovisioned user
    -overprovisioned groups
Identify overly generic policy items

FIG. 4

Identify redundant policy assignments
Track policy changes
Attribution
Conflict detection

FIG. 5 correlating policy defined groups with the roles implied from usage logs

FIG. 6

TECHNIQUES FOR RECONCILING PERMISSION USAGE WITH SECURITY POLICY FOR POLICY OPTIMIZATION AND MONITORING CONTINUOUS COMPLIANCE

FIELD OF THE INVENTION

The present invention relates to security policy analysis and more particularly, to techniques for correlating logs detailing resource access with access control security policies to ensure continued compliance of policy with high level security objectives, optimizations of security policy based on permission usage and the reduction of risk.

BACKGROUND OF THE INVENTION

Typically organizations have a high level security policy which arises from regulations that the organizations are required to comply with. This high level security policy is translated into specific access control permissions or entitlements for users on specific systems or applications. These policies define explicit rules for authentication and authorization (i.e., access control policies), and are enforced whenever a user requests access to resources.

Access control policies are created and maintained primarily manually by security administrators. Maintaining security policies is not only a huge work load for security administrators, but an incorrect policy can increase security risks such as data leakage and compliance issues. For a large organization with thousands of employees and resources, the number of policies can grow very large, and the policies can get very complicated. Furthermore, it is extremely hard to maintain the policies up-to-date as employees are added, removed, and/or change their job responsibilities. In many cases, security administrators have little insight on if the policies are adequate for the organization's purposes or how the policies are actually used, etc. Further, at any given time, there is no guarantee that the enforced policies correctly implement the high level security policy which the organization has to comply with.

To date there are no automated tools which can monitor the usage of entitlements or permissions and continuously verify that the usage is correctly reflective of the high level security policy. While a number of tools exist to analyze static policies (e.g., with role mining tools) these do not ensure that the policy is optimized to reflect the actual usage of permissions.

Therefore, techniques for optimizing the security policy to best reflect how permissions are actually being used as well as to monitor the usage to ensure that it complies with the intended security policy would be desirable.

SUMMARY OF THE INVENTION

Provided herein are techniques for correlating logs detailing resource access with access control security policies to ensure continued compliance of policy with high level security objectives, optimizations of security policy based on permission usage and the reduction of risk. In one aspect of the invention, a method for managing a security policy having multiple policy items is provided. The method includes the steps of: (a) mapping permissions to the policy items which apply to usage of the permissions so as to determine which of the permissions are granted to groups of users by each of the policy items; (b) identifying at least one of the policy items mapped in step (a) that is in violation of the principle of least privilege based on a comparison of an actual permission usage with the security policy; (c) identifying at least one of the policy items mapped in step (a) that increases operational risk; (d) verifying that policy constructs in the security policy are consistent with policy constructs inferred from the actual permission usage; and (e) identifying optimizations of the security policy based on output from one or more of steps (a)-(d).

A more complete understanding of the present invention, as well as further features and advantages of the present invention, will be obtained by reference to the following detailed description and drawings.

BRIEF DESCRIPTION OF THE DRAWINGS

FIG. 3 is a diagram illustrating an exemplary policy hierarchy according to an embodiment of the present invention;

FIG. 4 is a diagram illustrating analytics for use in identifying specific policy items that are in violation of least privilege from the usage permissions and their reconciliation with the security policy according to an embodiment of the present invention;

FIG. 5 is a diagram illustrating analytics for use in identifying policy items which increase operational risk according to an embodiment of the present invention;

FIG. 6 is a diagram illustrating analytics for use in correlating policy defined groups with the roles implied from usage logs according to an embodiment of the present invention;

DETAILED DESCRIPTION OF PREFERRED EMBODIMENTS

Provided herein are techniques for reconciling the usage of permissions or entitlements to an application or computer systems with the goals of optimizing the security policy to best reflect how permissions are actually being used as well as to continuously monitor the usage to ensure that it complies with the intended security policy. Policies should remain up-to-date, maintaining least privilege, and using unambiguous constructs that reduce administrative stress. This principle of least privilege is defined by J. H. Saltzer et al., "The Protection of Information in Computer Systems," Proceedings of the IEEE, 63(9):1278-1308 (September 1975) (hereinafter "Saltzer"), the entire contents of which are incorporated by reference herein. This principle states that users are given only the minimum privileges that are required to execute their functions. Saltzer argues that a least privileged user, combined with fail-safe defaults, e.g., default deny, lead to increased security. A number of analytics and heuristics are described herein that address various aspects of reconciling access control policies with security audit logs. A first set of analytics identify from the usage of permissions and their reconciliation with the security policy specific policy items which are in violation of the principle of least privilege. A second set of analytics identifies policy items which increase the operational risk due to the potential consequences from administrative or other errors. That is, these policy items are correct as such, but may be redundant or in general have no bearing on the final access control decisions for the resources governed by these policy items. As such, they may lead to errors when making policy changes resulting in unintended consequences. A third set of analytics compares the constructs, such as groups or roles, inferred from the usage of permissions, with the corresponding constructs in the policy to estimate how closely the policy matches current usage. Fourth, from the usage logs and the inferred roles, the deviation of the user population over time is measured. This analytic provides an indication of changes or flux in the user population that may bring it out of compliance with the security policy. Fifth, from these observations, optimizations of the security policy are identified.

Figure 1:
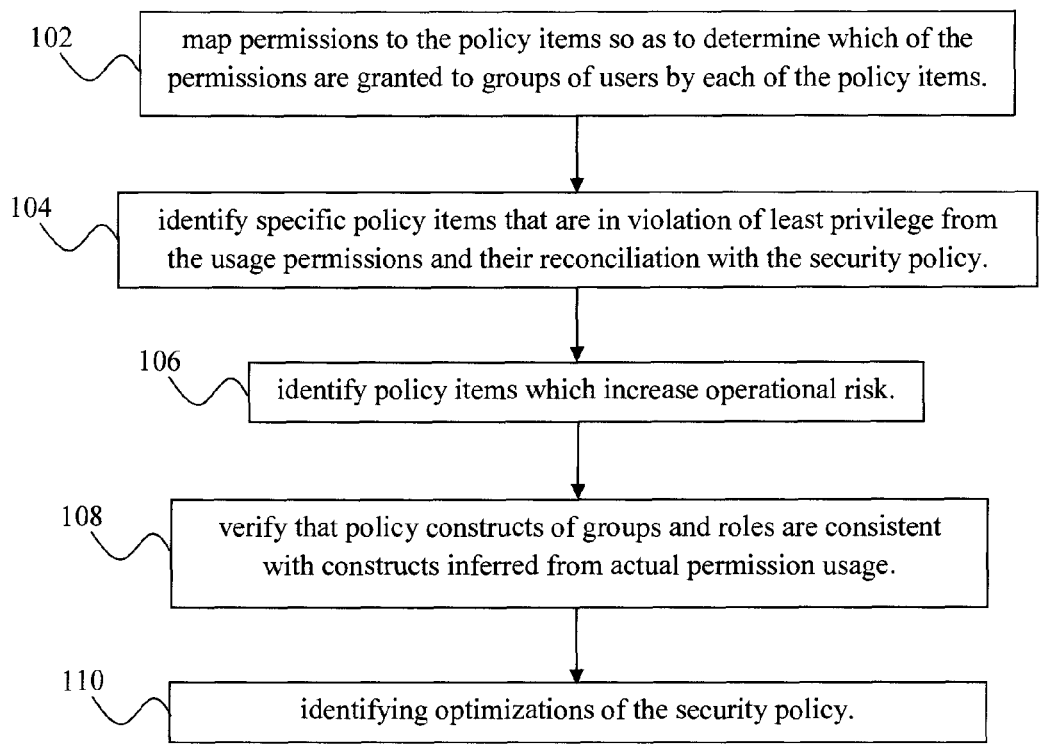
FIG. 1 is a diagram illustrating an exemplary methodology for managing a security policy according to an embodiment of the present invention.

An overview of the present techniques is provided by way of reference to FIG. 1. FIG. 1 is a diagram illustrating an exemplary methodology 100 for managing a security policy. As will be described in detail below, a security policy contains multiple policy items which assign entitlements or permissions to groups of users. Policy items may also be referred to interchangeably herein as policies, policy profile(s) and/or profile items. The term "groups of users" refers to the constructs of the entitlements of the security policy as compared to the roles inferred, e.g., from role mining procedures performed on actual usage of the permissions. This group/permission vs. role distinction will be explained further in the description below. Permissions may also be referred to interchangeably herein as permission assignments, assignments, and/or entitlements. As will be described in detail below, access control decisions (or simply decisions) of the policy items are used to grant, deny, or dictate some other relevant action regarding permission requests to access a resource(s).

Risk mitigation in organizations depends on verifying compliance, i.e., verifying that at any given time, the usage of permissions granted to users, by the enforced security policy, is consistent with the high level security goals that the organization is trying to meet. A typical layering of security policies in organizations is described, for example, in Bishop et al., "We have Met the Enemy and He is Us," NSPW '08: Proceedings of the 2008 workshop on New Security paradigms (September 2008) (hereinafter "Bishop"), the entire contents of which are incorporated by reference herein.

In the terminology of Bishop, the Oracle security policy corresponds to the high level security policy that the organization is trying to meet. The Feasible policy is that which can be defined and encoded by the system. The Feasible policy must be encoded and enforced by some system, e.g., an access control product that may define its own model. The Model policy layer is introduced herein as a subset of the Feasible policies that can be encoded and enforced through the security products.

The Configured policy is what is currently configured in the security framework and the Enforced or Used policy is the policy that is actually being enforced and reflected in the usage of the permissions. Bishop argues that a number of security vulnerabilities and breaches occur because of the mismatch in these policy layers.

A goal of the present process is to define techniques to verify and minimize the distance between policy layers, i.e., the Used policy closely implements the Oracle policy by comparing the Used and Model layers directly. To verify compliance, tools and techniques described herein are combined with reasoning that the Model policy correctly approximates the intended high level policy. This can be done inductively as follows: first initially verify through automated analysis and reasoning that the Configured policy is consistent with the Model policy. After this, continuous verification is used to ensure that: i) usage is consistent with the Configured policy; and ii) the policy constructs are being used consistently and continuously by the user population. Together, these steps are the evidence the present methodology provides that the usage of permissions is compliant with the Model and hence the intended high level policy.

Verifying the continuous compliance of usage to the intended policy has many distinct benefits to the security administrator. Foremost is the general reduction in operational risk due to the assurance that the usage is consistent with the intended policy. With the present techniques, the security policy is verified to be fresh and up-to-date, and it is ensured that the security policy accurately reflects the current needs and behaviors of users, and maintains least privilege. A number of the analytic techniques described herein also reduce the ambiguity in policies by verifying that policy entries are not redundant or overly expressive. This simplifies the administration of policies and reduces assignment errors made by administrators when assigning and revoking assignments.

Prior to analyzing the given security policy, in step 102, the permissions are mapped to the policy items so as to determine which of the permissions are granted to the groups of users by each of the policy items. As will be described below, each of the permissions may be granted to each group of users by one or more of the policy items. Thus, the mapping performed in step 102 is done to identify these policy-permission relationships in the security policy so as to enable analysis and optimization of the policy.

Figure 2A:
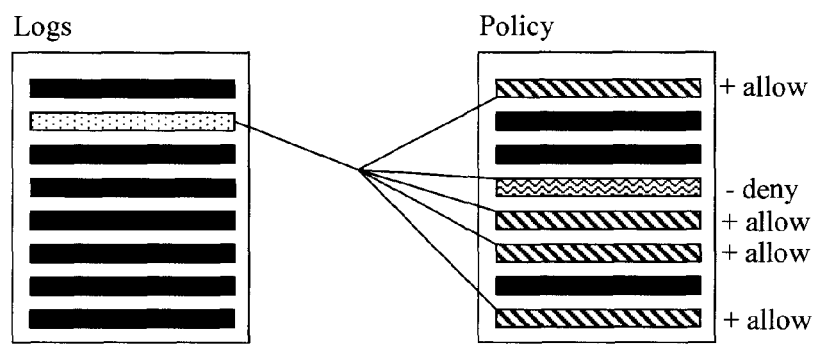
FIG. 2A is a diagram illustrating a 1 to n relationship where a permission can be granted by multiple policies according to an embodiment of the present invention.

Specifically, as illustrated in FIGS. 2A-D, there are six possible relationships between policies and executed permissions. Namely, there are a number of different scenarios regarding policies and applicable actions. For instance, a given policy can grant a permission request, or alternatively it can also deny, defer, throw an error, etc. Further, when there are multiple policy items pertaining to a particular resource (see, for example, FIG. 2A, described below) the different policy items might dictate conflicting actions. For instance one policy item might allow the request, while a second policy item might deny access to that same resource. With that in mind, FIG. 2A depicts a 1 to n relationship where actions regarding a permission can come from multiple security policies. As highlighted above, different policy items might dictate conflicting access control decisions with regard to the same permission request. Thus, using a simple example where a (+) symbol is used to denote the grant of a permission request and a (−) symbol is used to denote the denial of a permission request, FIG. 2A illustrates how multiple policies can apply to conflicting actions for the same request.

Figure 2B:
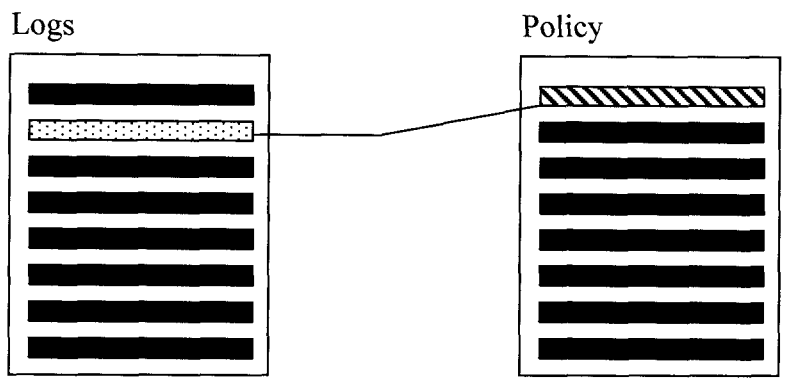
FIG. 2B is a diagram illustrating a 1 to 1 relationship where one policy accounts for multiple permissions according to an embodiment of the present invention.

FIG. 2B depicts a 1 to 1 relationship where one policy accounts for one permission. In the example shown in FIG. 2B, the policy might grant, deny, defer, etc. the action (i.e., permission request)—see above. However, since there is a 1 to 1 relationship, there are no conflicting policies present.

Figure 2C:
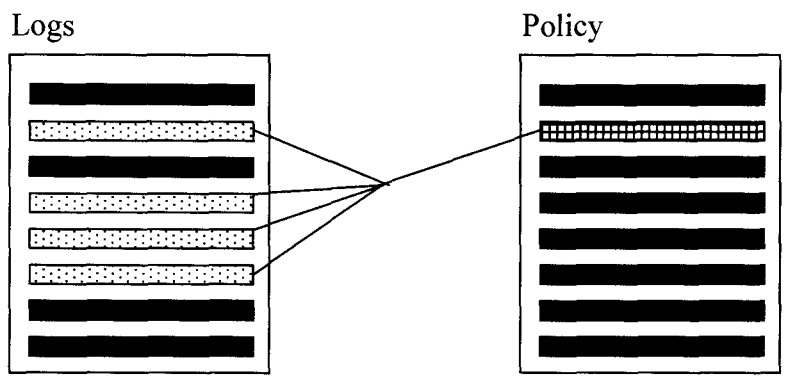
FIG. 2C is a diagram illustrating an n to 1 relationship where one policy accounts for multiple permissions according to an embodiment of the present invention.

FIG. 2C depicts an n to 1 relationship where one policy accounts for multiple permissions. Again, the policy might grant, deny, defer, etc. the actions (i.e., permission requests)—see above.

Figure 2D:
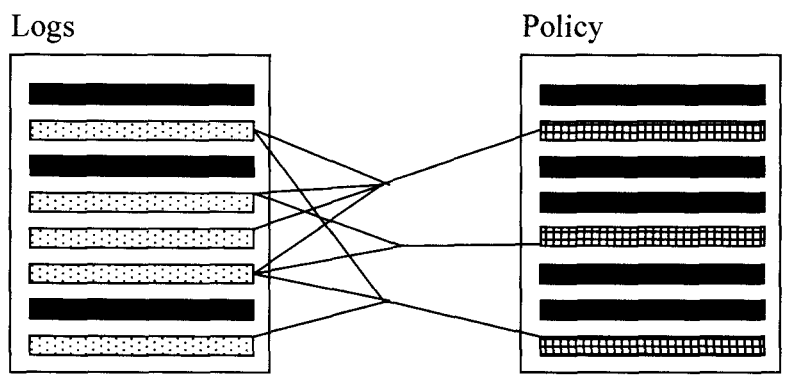
FIG. 2D is a diagram illustrating an n to n relationship according to an embodiment of the present invention.

FIG. 2D depicts an n to n relationship. Here, as with FIG. 2A (described above), different policies might dictate different actions for the same request. Namely, as shown in FIG. 2D, some of the policies apply to the same permission request, i.e., there are some permissions that are governed by multiple policies. As described in the simple example above, one of the policies governing a particular permission might grant the permission while another policy denies the same permission request. These are conflicting policies.

Policy and user hierarchy construction are now discussed. Policy hierarchy construction—access permission policies state a set of triples of {user, resource, access method}. In typical systems, a single policy item can govern the granting or denial to a group of users the right to access a group of resources. If this is present then one can construct a hierarchy from the various policy items: a policy item subsumes another if it is applicable to the same set of users but governs the right to more resources. Alternatively we could simply consider a policy hierarchy over resources governed by the items, or we could consider a policy hierarchy over the users governed by the policy items. A policy item which subsumes another is said to be the super-policy and the subsumed policy is the sub-policy.

Furthermore, user policies and group policies are also determined. Some policy items are applied directly to specified individuals (e.g., clear nodes in FIG. 3) and these are called user policies. FIG. 3 is a diagram illustrating an exemplary policy hierarchy. In typical systems, policy items are sometimes assigned to users indirectly through assignment of users to intermediary groups or roles and the assignment of permissions to these groups or roles. Such policies (e.g., black nodes in FIG. 3) are called group policies.

User hierarchy construction—many organizations support role-based access control to reduce the number of users to maintain in the policy. A role typically includes a group of users who use similar permissions. A hierarchy of users and groups can be constructed from the user-group membership information. A group can subsequently belong to another group. Note that there are various conventions or semantics regarding the inheritance implied by such hierarchies and these should be taken into account during the analysis.

The present techniques then analyze a set of permission usage logs and determine (from matching policies) the actual policy item whose access control decision was used to grant the permission requests. Matching policies are the policies that have the same resource name as the one used in the permission or the policies of which resources subsume the one used in the permission. There can be multiple matching policies, and various systems have different policies regarding which policy item among the (multiple) matching policies has precedence, e.g., in some instances the most specific policy is consulted to grant/deny permission, in others it is the first policy item that matches, and yet in others it is the most permissive policy item. Any or all of these analytics can be adapted to the present techniques as long as the precedence rules are known.

According to the present techniques, optimizations of the security policy can be identified based on the policy-permission relationships mapped in step 102 and/or based on how the permissions are actually being used (by the groups of users) based for example on usage logs which are indicative of how the permissions are actually being used. Thus, referring back to FIG. 1, in steps 104 and 106 optimizations of the security policy are identified based on i) the mapping performed in step 102 and/or ii) usage logs of the groups of users. Namely, in step 104, specific policy items that are in violation of least privilege are identified from the usage permissions and their reconciliation with the security policy. By way of example only, this can include identifying redundant policy assignments, identifying overprovisioning (i.e., overprovisioned policies, users and/or groups), and identifying overly generic policy items. In step 106 policy items which increase operational risk are identified. By way of example only, this can include identifying redundant policy items, tracking policy changes, attribution, and conflict detection. These analytics are described in further detail below. Next, based on the analysis performed in steps 102-106, optimizations of the security policy are identified in step 110. This can involve, for example, correlating policy defined groups with the roles implied from usage logs (using, e.g., role mining). This optimization process will be described in detail below. The following definitions are used in the description:

Definition 1. A policy profile is a-consistent with usage, if a percentage of the total granted authorizations have been used within a given time window. (a,t,t')-consistent may be written to make the time window [t,t'] explicit.

A policy profile may be an individual permission that grants access to multiple resources (for example, granting access to a database that grants access to the individual tables and columns), or a group permission that aggregates multiple individual permissions.

Definition 2. A profile is unused in the time window [t,t'], if the user never attempts to perform an action that requires evaluating the profile.

Note that an unused profile may be applicable to a request made in [t,t'], but there exists a more specific profile that is evaluated instead.

Definition 3. A profile is a-generic, if a percentage of the resources it protects are never accessed by the user. One might say a profile is too generic if a exceeds a threshold $\epsilon$.

Definition 4. A group is $\beta$-over privileged, if it contains profiles not used by more than $\beta$ percentage of the group members.

Definition 5. A profile p is applicable to a request r if p(r) returns a decision.

Definition 6. Given a policy P and a profile item p, an administrative revocation has ambiguous intent if for all requests r that P is applicable to, $p(r) \equiv P(r) \equiv P\backslash\{p\}(r)$, and similarly redundant for an assignment $p(r) \equiv P \cup \{p\}(r)$.

A set of conventions and examples of policy, resources, and usage data that are exemplary, and which will aid the exposition of the analytic is now described.

A natural grouping of resources is hierarchical in many systems. For example a dataset in z/OS is represented as a period-delimited path. Discrete profiles are those that explicitly reference the full dataset name, e.g., A.B.C.DATA, while generic profiles refer to groups of resources described using the following wildcards.

%: a single character, e.g., A.B.C.% ATA matches the above.

*: more than one character, but not the period, e.g., A.B.C.* matches the above, but A.B.* does not.

: more than one character including the period, e.g., A.B. matches the above.

In all instances, the high-level qualifiers cannot contain wildcards, i.e., **.DATA is not valid. In a Unix or Linux-like system a file system is separated by the forward-slash (/) where the question mark character (?) represents a single non-forward-slash character, and a * represents zero-or-more non-forward-slash characters. Similarly, in Windows the backslash character is used instead of the forward-slash. Most operating systems, applications, and security subsystems can log when a user exercises a permission. We assume that we are able to identify which policy profile(s) specified a specific action. For example, in some systems, such as RACF, we are able to pin-point the single policy item that governed the action decision. In other cases, with access to the policy, this can be accomplished by evaluating the policy.

As described above, the optimization opportunities for the security policy may be identified from the security policy itself (e.g., by analyzing the policy and associated permissions (mapped, e.g., example as per step 102 of FIG. 1) and/or from the security policy in conjunction with usage patterns, i.e., from how the permissions are actually being used. These policy analytic techniques are now described in further detail.

As described in conjunction with the description of step 104 of FIG. 1, above, specific policy items that are in violation of least privilege can be identified from the usage permissions and their reconciliation with the security policy. This is performed using a first group of analytics. See FIG. 4. As will be described in detail below, the present analytics can be used to provide insights using the following steps: (a) Identification of redundant policy assignments: this occurs when the decisions specified by policy items are always covered by other policy items which have a higher priority in the access control decision—such items can result in entitlements not being correctly revoked and may violate least privilege if the superseding policy items are then revoked; (b) Identification of policy overprovisioning: this is to identify when a policy item is never or rarely used—this could represent an over-provisioning policy item (similarly we can identify overprovisioned users, i.e., users who have privileges that they rarely use, and similar analysis can be applied to find overprovisioned groups); and (c) Identification of overly generic policy items: policy items which are too generic and can be represented by combinations of more specific policies.

Identifying Redundant Assignments: redundant profile authorities occur when a user is assigned two profiles where one profile subsumes the other, making the more specific authority redundant. A profile subsumption relation is defined as in the following:

Definition 7. A profile $p_1$ subsumes profile $p_2$ if $p_1$ appears in a path from the root to $p_2$ in the policy hierarchy.

For illustrative purposes only, in the case of RACF, profile C.*.** subsumes C.D.E.*., and V. subsumes V.*.F*.**, respectively. In these examples, C.D.E.*.** and V.*.F*.** are redundant policies, as all of the permissions that the two profiles authorize can be granted by their subsuming profiles. These redundant profiles are unnecessary and only increase the complexity and maintenance burden of the policy. Further, having redundant policy profiles can lead to errors when assignments are removed. When a permission assignment is removed from a user, all subsumed policies should be evaluated and the administrator notified of possible omissions.

To detect redundant profile assignments, all assigned entitlements for a user are collected, and it is determined if there are any two entitlements in which one subsumes the other. Profile subsumption relationship can be efficiently detected using the policy hierarchy described above, and thus this analytic can be applied to any policy domain where the resources are hierarchically organized and policy is inherited.

There are a number of insights we can learn from policies which assign redundant entitlements to users. For instance, if the fraction of users with redundant entitlements is higher than some pre-defined threshold t, it indicates that security administrators may not perform redundancy checks when a user is assigned multiple entitlements. This indicates potential problems with the entitlement provisioning process where inconsistent tools are being used or that these tools do not perform redundancy checking, since manual verification of entitlement redundancy is not feasible given the number of entitlements and users. Other analytics are described herein where a user's configured policy is correlated with a user's actual access patterns, and used to identify which profiles among the redundant profiles control resources that the user actually uses the most. Combined with that analytic, an optimal set of profiles can be generated for the user without redundant profile assignments.

Identifying Policy Overprovisioning: This set of analytics correlates the usage of permissions to the policy definitions and simply counts which policy items are relevant, i.e., actually authorize an access request. For instance, relevant policy items can be identified as those policy items which were used during a given time period to authorize a permission/access request. Conversely, non-relevant policy items are those policy items which permit access to some resources but have not been used to authorize any access requests during the given time period. By analyzing how frequently a policy item was relevant, and over what time period, there are many questions we can answer, for example, which policy items are most frequently used or which are used for the longest time frame, e.g., more generic policy items, or more specific items. From this we can learn which policy items are most relevant over time. We identify policy over-provisioning by identifying over-privileged users and groups.

Identifying Over-Privileged (Over-Provisioned) Users: a policy profile is considered to be an over-assignment for a user if the user never or rarely uses (e.g., less than a threshold number of times over a given time window, see for example Definition 2, above) the profile, and a user is considered an over-privileged user if the user owns many (e.g., over a threshold number of) over-assignments. It is not feasible for the security administrators to predict possible over-assignments beforehand, and thus there can be a large number of unintended over-privileged users, resulting in a suboptimal policy.

Over-privileged users can be discovered by correlating access logs and the policy by measuring the number of resources the users have access to that they are not leveraging. This provides a measure of how far away the policy is from least privilege. By comparing the amount of over privilege to the number of distinct resources the user actually accesses we gain a normalized view score of the amount of over privilege. This gives us one key measure for how far the usage is diverging from policy and thus the least privilege principle.

Identifying Over-Privileged (Over-Provisioned) Groups: Overly permissive groups are the groups of which many members rarely (e.g., below some pre-defined threshold) use the permissions granted to the group. Thus, for example, it can be determined whether a user in a given group is over-provisioned with respect to the permissions of the given group by identifying if the user does not use, or uses less than a pre-determined threshold number of times, more than a pre-determined threshold fraction of the permissions assigned to the given group. A user who does not use any of the group policies or uses only few (e.g., below some pre-defined threshold) policies may be over-provisioned, and the policy with these over-provisioned users violates the principle of least privilege. Given a time window of interest, we can monitor how often each member of a group executes the policies assigned through the group to determine the fraction f, such that the group is f-overprivileged (see Definition 4 above). This gives us a measure of the over provisioning of user and divergence of least privilege. Further if users are not leveraging the assignments they gain from groups, it indicates the group structure does not match the needs of the users well, and the group assignments have diverged from the needs of the users.

For each group defined in the policy we compute the fraction of users in the group who are overprovisioned as evidenced by the permission usage logs. For each group g this determines the highest value of f for which the group is f-overprivileged. If this fraction is higher than some predetermined threshold t, we can mark this group as over-privileged and potentially, re-organize the group or the privileges assigned to the group.

Identification of Overly Generic Policy Items: Another set of analytics to detect if the security policy violates the least-privilege principle is the identification of policy items which are overly generic. Specifying access control policy at each individual resource level makes the size of the policy unmanageably large. Thus, most of the policies are represented as generic profiles using wildcard symbols such as % and * to cover multiple resources. While more generic profiles reduce the number of profiles and thus decrease the maintenance burden for security administrators, these generic profiles become overly permissive and increase the security vulnerability.

According to an exemplary embodiment, a given one of a policy item(s) which is/are overly permissive in the number of resources to which the policy item(s) grants access, and thus is in violation of least privilege, can be identified by determining if more than a first pre-determined threshold fraction of users who are granted access to one or more of the permissions through the policy item(s) use less than a second pre-determined threshold fraction of the permissions granted by the policy item(s) within a certain given period of time.

To identify if a specific policy item is overly generic, the expressiveness of the resource specified in the policy, i.e., the number of resources that the policy expression refers to, can be reconciled with the actual resource to which access was granted. With the permission usage data, overly permissive generic profiles can be identified by examining all the resources accessed by the profiles, and by generating the most specific generic profile name that covers all of the accessed resources in a bottom-up way. If the defined profile is more generic than the generated profile name, then the policy is considered overly permissive. If the resource hierarchy is known in advance, then we can quantify how much more generic the policy item: this can be the ratio of the number of resources covered by the policy profile and the number of resources in the defined profile. A ratio of 1 is when the policy profile exactly matches the usage with higher numbers indicating the amount of over-provisioning. When access logs over a long time period are available, these dynamically generated profile names can be very reliable, and can be used to rewrite the overly permissive profiles with a lower scope.

By identifying overly permissive policies, one can measure the deviation from least-privilege and identify permissions that may be redefined to reduce their scope and reduce risk. For example, if a permission is used frequently (greater than a threshold n per time period), for access to a small number of resources, (for example below a fixed threshold fraction of the number of resources specified in the policy), compared to what is allowed in the policy, then it is overly-permissive. In this case, the resources can be represented in a more specific profile as proposed by the present system.

As described in conjunction with the description of step 106 of FIG. 1, above, policy items are identified which increase operational risk. This can be done using a second group of analytics. See FIG. 5. This second group of analytics targets those policy items which are prone to lead to administrative error when policy changes are made or new provisioning actions are taken. These methods include (a) Identification of redundant policy items as described above; (b) Tracking of policy changes: this is to ensure consistency in intent so that the revocation or granting is correctly reflected in the resulting policy; (c) Attribution: this will ensure that the attributes of newly granted users are consistent with those already assigned given entitlements; and (d) Conflict Detection: this will identify policy items that yield conflicting results for an access decision, such as where the method for combining multiple policy items (e.g., first applicable, most specific, allow overrides) results in a different final decision.

Tracking of Policy Changes: User entitlements change over time, as new entitlements can be assigned or existing entitlements get revoked. This analytic is used to monitor how policy assignments change over time. In particular, the following two questions are addressed:

Are users mostly (above a certain given percentage of policy change actions) granted new entitlements, or are policy assignments often revoked?

When a policy assignment is revoked, are all the redundant policies also revoked?

The failure in the latter case indicates incomplete revocations. The policy hierarchy enables automatic identification of incomplete revocations in a straightforward manner. When a profile is removed for a user, all of the subsuming policies are retrieved from the hierarchy, and it is verified whether they are still authorized for the user.

Inferring Policy Changes from Logs: while an analysis of the policy alone can indicate when policy changes are made, permission usage logs can provide subtle insights not present in the policy change logs. For example, if a policy rule changes, how does that impact the actual usage of the users? Access control decisions are tracked to datasets across time to detect changes in the policy and measure how the changes may impact the end users. This analysis is extended to use allowed or denied user actions as a precursor to policy changes.

To accomplish this, the access logs are analyzed to produce a temporally ordered list of user requests and note several key details. First, the decision, e.g., SUCCESS or INSAUTH (insufficient authorization) is noted, which indicates when a privilege was allowed or denied. Any change in the access control decision correlates with a grant or revoke operation. Next, the policy item(s) used to handle the request is noted, even when the access control decision does not change. Since we have assumed that either the system directly provides us, or we can infer the policy items(s) used to make access decisions, inferences can be made on the types of policy changes that occurred. Given the precedence rules in the security policy, it can be determined if a policy item was added or removed. For example, when the most specific policy item overrides and a more specific policy item was used (e.g., for an allow), one can argue that the administrator is reaffirming the user's access to those resources (albeit including a potentially redundant assignment), while a more generic profile indicates the user's profile was revoked. If the decision does not change, then the administrative intent was ambiguous.

Next, any requests where the applied profile for an access decision changes is analyzed. If the policy item changes, it implies there was a policy change. Next, given the policy item preference (such as first applicable or most specific), it can be determined if the access profile item changed due to the addition of a new policy item, or the removal of an old policy item. For example, given a most-specific precedence, the change to a more general rule implies an old rule was revoked. If the access decision does not change, there is an indication that administrator's intent was not correctly applied to the policy, possibly resulting in an error. Further, a change from a positive (grant) to a negative (deny) or vice-versa can have different connotations if a rule was added or removed.

The results of the analytic can be used to cleanse the policy of items which can lead to erroneous administrative actions. This analytic is designed to detect possible policy items that may result in administrative errors, as above, that are invoked by the end users, that is, the realization of such errors. As above, this analytic will depend on the policy combining rule used by the security policy, which is used to determine if a rule was added, or removed, from the policy. When a rule was added or removed that does not change the decision, it is possible the administrator's intent is not being correctly reflected, as they have either added a redundant rule, or revoked a rule that resulted in the same level of access.

If the profile item changes, it implies there was a policy change. Next, given the policy item preference (such as first applicable or most specific), it can be determined if the access profile item changed due to the addition of a new policy item, or the removal of an old policy item. For example, given a most-specific precedence, the change to a more general rule implies an old rule was revoked. If the access decision does not change, there is an indication that administrator's intent was not correctly applied to the policy, possibly resulting in an error. Further, a change from a positive (grant) to a negative (deny) or vice-versa can have different connotations if a rule was added or removed.

Attribution of Policy Items: This analytic attempts to verify that the user being assigned an entitlement is similar to other users who have similar or the same entitlements. We measure the similarity between the new candidate user and the existing users by measuring how close they are (as specified in a distance function below) on a chosen set of security relevant attributes. For some key attributes, such as department and division, the distance can be measured as an exact match, or how far apart the values are according to the organization's internal structure, e.g., reporting structure. For other attributes, such as a job title, a domain specific distance will be applied. An aggregate distance function is a domain specific value that combines the distance measure across each attribute of the user. A user is considered too different for the entitlement compared with the other assigned users if (a) the distance for any single attribute exceeds a threshold t; (b) the aggregate distance exceeds a given threshold t; or (c) at least n attributes are not within a threshold t.

The attribute compliance for the user can also be estimated using a machine learning classifier such as a support vector machine (Vladimir N. Vapnik, Statistical Learning Theory, Wiley-Interscience, September 1998. ISBN 9780471030034), logistic regression (David W Hosmer; Lemeshow, Stanley (2000), Applied Logistic Regression (2nd ed.), Wiley. ISBN 0-471-35632-8. These processes take a set of users and their attributes, where some users are granted the entitlement, and some users are not, and produce a model of the users who are assigned the entitlement. The attributes can be first converted into a feature set, such as a list of boolean value. If the trained classifier predicts the new candidate user should not have the entitlement, we alert the administrator of the potential error.

Conflicting Policy Item Detection: A security policy can be viewed as the result of multiple individual provisioning actions that are combined to produce a final access decision for a request. When an administrator views a small number of policy items, the interaction of multiple items may become ambiguous to the administrator who incorrectly interprets how the policy items will interact and be combined for the final decision. When there are multiple policy items that all pertain to the same action on the same resource that return different decisions, there are precedence rules that determine which rule gets evaluated or how the decisions of the rules are combined to produce a final decision. While the interaction of these policy items may be correct in the current version, this is a potential candidate for administrator error when policy items are added, removed, or altered. We count and flag such combinations as potential error in the current or future incantations of the security policy.

As described above, based on the analysis performed in steps 102-106 of FIG. 1, optimizations of the security policy can be identified which can involve correlating policy defined groups with the roles implied from usage logs (using, e.g., role mining) (step 108). This can be done using a third group of analytics. See FIG. 6. This third group of analytics attempts to verify that the policy constructs of groups and roles are consistent with similar constructs that can be inferred from the actual permission usage. This ensures that the roles and groups in the policy correctly map to roles and tasks the users perform as a part of their duties.

Correlating Policy Defined Groups with Roles Implied from Usage Logs: as described, for example, in conjunction with the description of step 106 of FIG. 1 above, the actual usage of permissions by the groups of users can be analyzed using role mining procedures which seek to discover implicit roles from permission usage patterns. Specifically, the analytic provided herein for verifying if the Configured policy is consistent with its Enforced or Used policy is to validate if the group definitions in the policy (i.e., explicit roles) are currently relevant and reflect the actual roles the group members assume (i.e., implicit roles). Users' actual roles can be inferred from logs of the permissions usage, using role mining techniques. See, for example, M. Frank et al., "A probabilistic approach to hybrid role mining," CCS '09 (November 2009) (hereinafter "Frank") and Molloy et al., "Generative Models for Access Control Policies: Applications to Role Mining Over Logs with Attribution," Proceedings of the 17$^{th}$ ACM Symposium on Access Control Models and Technologies, SACMAT '12 (June 2012) (hereinafter "Molloy"), the entire contents of each of which are incorporated by reference herein. This section presents analytic methods to test if the policy groups correspond to actually assumed roles. If the mined roles differ significantly from the defined groups, this indicates that the policy's group definition is, perhaps, no longer relevant and the usage may be considered to be not compliant.

Role Mining: the generative role modeling approach described in Molloy is applied herein to discover the implicit roles from users' access patterns. Molloy uses Latent Dirichlet Allocation (LDA) to mine roles from access logs. See, for example, D. Blei et al., "Latent Dirichlet Allocation," Journal of Machine Learning Research 3, pgs. 993-1022 (January 2003) (hereinafter "Blei"), the entire contents of which are incorporated by reference herein. The technique attempts to explain how the observations (i.e., use of entitlements) were generated given certain hidden parameters (i.e., roles) in the following way.

Each user is modeled as a finite mixture over an underlying set of roles, and each role is in turn modeled as a distribution over profiles. LDA assumes the following generative process in which a user u is created:

1. For each user u∈U, a distribution over roles is sampled from a Dirichlet distribution, θ: Dir (a)
2. For each profile p used by a user, select a role, z, according to the distribution, Multinomial (θ)
3. Finally, a profile is chosen from a multinomial probability distribution over profiles conditioned on the role, p (p\z, β.

The role mining system produces two probability distributions—a probability distribution over the roles for each user, and a distribution over profiles for each role. For the following description, the set of distribution vectors for various models m:$\Phi_m = \{\phi_{m,r} | r \in R_m\}$ where each $\phi_{m,r}$ is one probability distribution for a role r out of the set or roles $R_m$ for the model m is being used. The discrete roles from Molloy are used.

Consistency of Mined Roles: before comparing the roles mined from usage logs with the groups in the security policy, it is preferable to ensure that the roles obtained are consistent over time. To validate this, generative models are generated from access logs across different periods in time and the similarity between these models is evaluated.

Let $\Phi_m$ be the probability distribution of the mined roles over permissions for a model m. $\Phi_{p,q}$ will be used to denote the probability distribution for the p-th model generated from the q-th period (1≤p≤10 and 1≤q≤4 in this experiment). For validation, the models within each period were compared as well the models for different time periods.

Definition 8. An Optimal Role Mapping is the mapping of all roles in a model m onto the roles of model m' (i.e., a permutation π over the role indices) so that the aggregate root-mean-square error (RMSE) for a vector-wise comparison is minimized:

$$\sum_{i=1}^{k} RMSE(\phi_{m,i}, \phi_{m',\pi(i)}) | \phi_{m,i} \in \Phi_m \wedge \phi_{m',\pi(i)}) \in \Phi_{m'}$$

Definition 9. The distance between models m and m' ($D\Phi_m, \Phi_{m'}$) is the aggregate RMSE for a vector-wise comparison given an optimal role mapping between m and m'.

By evaluating how the distance between these two models increases or decreases over time, one can measure the change in user behavioral roles. If the distance exceeds some threshold, t, then the user population has changed (and the groups and roles in the security policy are considered non-compliant and can be marked as such) and to maintain in compliance the behavioral shift must be corrected or the behavioral changes should correspond with a change in the security policy. While the roles of the user population remain stable, we do not expect extensive changes in the security policy.

Comparison of Defined Groups and Mined Roles: after ensuring that the mined roles are stable, the mined roles are compared to the groups defined in the policy. This helps measure if the defined groups are relevant, i.e., do the mined roles and the profile distributions they represent match the way the profiles are linked to groups. Groups and roles were compared by comparing probability distributions representing the expected activity (i.e., the distribution across the exercised profiles) for both groups and roles. For inferred roles, the probability distribution can be extracted for the i-th model for the q-th period from the LDA model $\Phi_{iq} = \Phi_{iq} = \{\phi_{iq,r} | r \in R_{iq}\}$.

For groups, the probability distribution can be created based on the usage information from the audit logs. For each logged resource access for a user, the list of groups that may grant the user access to this resource is determined. The audit logs contain the profile granting access, so this is done by finding all groups to which the user is assigned that are linked to the user profile. All accesses are aggregated per group, resulting in a vector describing how often a profile was used to grant access to a resource. The aggregation is aligned to the time periods used to create the LDA models. These aggregate usage counts are normalized to obtain the probability distribution over the profiles for each group. Thus, a set of probability distributions $\Phi_{g,q}$ is obtained, where g is the group id and q is the period number. Each one of these probability distributions can now be compared to all the roles for all models in the same period q.

Definition 10. Candidate role c ($\phi_{g,q}, \Phi_{iq}$) for a group probability distribution and a model for the same time period is the role r minimizing RMSE($\phi_{g,q}, \Phi_{iq,r}$). Candidate role distance is the RMSE between the candidate role and the model probability distribution for the corresponding period.

Candidate roles represent the most likely matching mined roles for a group. Candidate role distance can be used to estimate if a group has a properly matching role. The goal is to define a threshold to determine if a candidate role is likely to be the mined equivalent of the defined group.

Definition 11. Candidate role set for a group g is the set of all candidate roles for all probability distributions for the group and their corresponding models:

$$C(g) = \{c(\phi_{g,q}, \Phi_{iq}) | 1 \le q \le 4 \wedge 1 \le i \le 10\}$$

Candidate role sets represent the possible matches for a group across multiple time periods in multiple iterations of the role mining. By examining candidate role sets, it can be determined whether a group is consistently matched (or unmatched).

When the distance between the defined groups and observed roles is small, e.g., below a threshold t, then the user behavior still matches the security policy, and we can consider the groups valid for the observed behavior. Otherwise, we do not consider a group to be a valid candidate for the observed behavior, and the distance measure can be used to measure the amount of deviation. This indicates these groups may need to be evaluated for compliance. In these instances, we consider the number of actions mapped to each group or role. When the number of actions is low, it may be an indication the role is infrequently used.

The analysis performed on the audit log data can be used to confirm if the following hypotheses about the relationship between groups and inferred roles are true:

Groups that are frequently used and consistent with usage are clearly identified based on the chosen threshold parameters. While this analytic easily generalizes across other data sets, it is expected that the actual thresholds will vary across datasets and can be obtained with some experimentation.

Groups that are frequently used but identified as inconsistent with use show high overlap with other groups in terms of use. Such groups are good candidates for potential re-engineering to better match the actual use. Once the correct adjustments to the group design are determined an evaluation can be made as to whether further analytics can be used to support the redesign process based on best practices created in cooperation with the administrators. If there are groups which are rarely used and are a poor match with the mined roles, then their relevance must be hand-validated by administrators.

Policy Optimization Based on Analytic Insights: Based on the results of the analytics for least-privilege analysis, policy items which may lead to administrative errors, and the reconciliation of policy constructs with usage, we can perform or suggest a number of optimizations which can yield policies that match high level security goals. Any changes in the policy must be performed with administrative review in order to best reflect the characteristics of the domain at hand. For example, ensuring the availability of access in some domains may be more important while ensuring the confidentiality of the data is more important in others.

The following are some of the suggested optimization actions based on the analytics described above:

f. Identified redundant policy assignments: These are good candidates for policy optimization because they don't impact the final authorizations. It is suggested the administrators eliminate all but one of the redundant assignments (and thereby effectively eliminating/dropping all of the redundant assignments).

g. Identified policy overprovisioning: When confidentiality of the resources is important, the over-provisioned policy items should be eliminated to reduce the risk of disclosure. For instance, non-relevant policy items should be eliminated. In some domains some authorizations are used seasonally, or availability of access is important, and it may be necessary to maintain the over provisioned policy items. One possible mitigating measure if to perform audits when the overprovisioned authorizations are used. With regard to over-provisioned users, the permissions for which the users are over-provisioned (i.e., the permissions which the users do not use, or use less than a pre-determined threshold number of times during a given time period—see above) should be revoked to maintain least privilege. With regard to over-provisioned groups, the users that are over-provisioned with respect to the permissions of the group can be removed from the over-provisioned groups to maintain least privilege. Further, one can revoke any of the permissions from the over-provisioned groups of users that are not used by a pre-determined fraction of the users in the over-provisioned groups.

h. Identify overly generic policy items: Similar to the identified policy overprovisioning, when confidentiality is important, the overly generic policy items should be replaced with finer grained policy items. If availability is important, it may be desirable to maintain the overly generic policy items, or find an intermediate state. Overly permissive policy items (identified as described above) can be rewritten to only apply to a minimal set of permissions that are actually accessed in a given period of time so as to maintain least privilege.

i. Tracking of policy changes: This is a continuous metric that is applied for every authorization change. If users are primarily granted or revoked authorizations, the administrator can be prompted to verification. Users who are only granted new authorizations may be changing positions, and may retain old entitlements that should be revoked. When incomplete revocations are identified (see above) it is preferable to revoke all of the policy items which apply to the same permissions as the incomplete revocations so as to decrease operational risk.

j. Attribution: When new authorizations are added and the user is too dissimilar to the others assigned the policy item, we prompt the administrator to ensure of change. If the administrator confirms the addition, the attribution model for the group is retrained for the added user.

k. Conflict Detection: When an administrator makes a change to a policy that results in conflicting policy items, or alters an existing policy item, the administrator is prompted to obtain confirmation. The administrator may be provided with an analysis of which rules are interacting, and how they will be combined, possibly using examples from the audit logs. The administrator can confirm they understand the changes they are suggesting.

l. Inferred Role Changes: If the inferred roles mined from the usage logs change over time, the administrator should be alerted to the change and new policy groups, possibly derived from the inferred roles, suggested to the administrator as alternatives. Deviation Between Groups and Inferred Roles: If the deviation between the inferred roles mined from usage logs and the groups defined in the security policy deviate beyond a threshold t, the administrator should be alerted that the behavioral patterns of the users and the defined security policy are not in alignment. A new group, derived from the inferred roles, may be suggested to the administrator. For instance, the groups and roles that differ from the roles inferred from the actual permission usage (e.g., by a amount greater than a pre-determined threshold) can be eliminated, and conversely, a new group can be created in the security policy for these inferred roles that has the same users as the inferred roles and who are assigned the exact same permissions.

Figure 7:
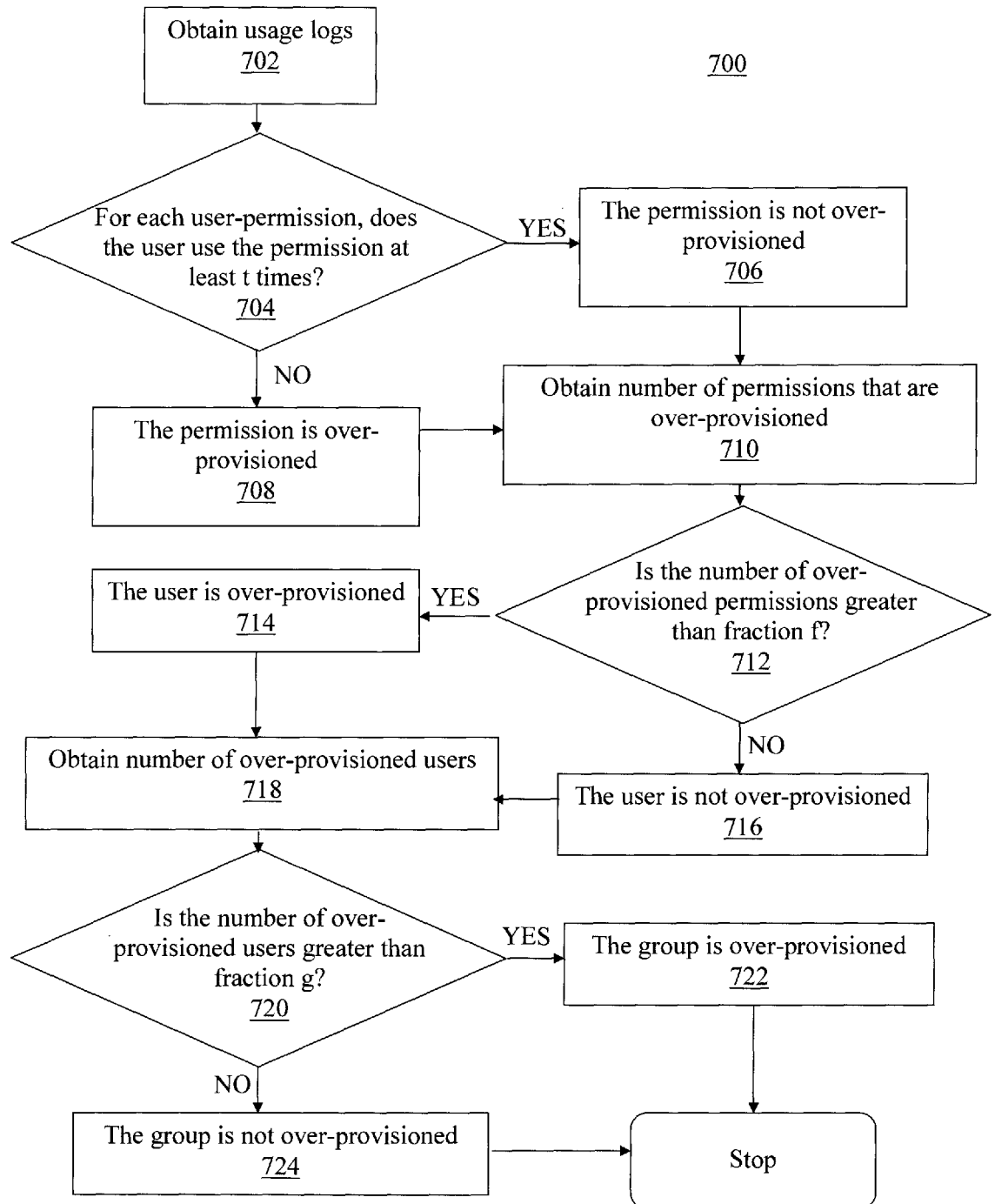
FIG. 7 is a diagram illustrating an exemplary methodology for identifying over-provisioning (i.e., over-provisioned permissions, users, and groups) in a security policy based on usage logs according to an embodiment of the present invention.

FIG. 7 is a diagram illustrating an exemplary methodology 700 for identifying over-provisioning (i.e., over-provisioned permissions, users, and groups) in a security policy based on usage logs. The details of identifying over-provisioned permissions, over-provisioned users, and over-provisioned groups were provided above. Methodology 700 provides one exemplary flow of how the over-provisioning analysis (based on the above described analytics) can be carried out. Methodology 700 may be carried out by an apparatus such as apparatus 1000 of FIG. 10.

In step 702, the usage logs are obtained. As provided above, the usage logs reflect how the permissions/entitlements are actually being used. In step 704 a determination is made, for each of user-permissions, as to whether the user uses the permission at least t times. If the user uses the permission at least t times, then as per step 706, the permission is determined not to be over-provisioned. On the other hand, if the user does not use the permission at least t times, then as per step 708, the permission is determined to be over-provisioned.

Next, in step 710, the number of permissions that are over-provisioned is obtained and in step 712 a determination is made as to whether the number of over-provisioned permissions is greater than a fraction f. If the number of over-provisioned permissions is greater than a fraction f, then as per step 714, the user is determined to be over-provisioned. On the other hand, if the number of over-provisioned permissions is less than a fraction f, then as per step 716, the user is determined not to be over-provisioned.

Next, in step 718 the number of over-provisioned users is obtained and in step 720 a determination is made as to whether the number of over-provisioned users is greater than a fraction g. If the number of over-provisioned users is greater than a fraction g, then as per step 722, the group (to which the user belongs) is determined to be over-provisioned. On the other hand, if the number of over-provisioned users is less than a fraction g, then as per step 724, the group (to which the user belongs) is determined not to be over-provisioned.

Figure 8:
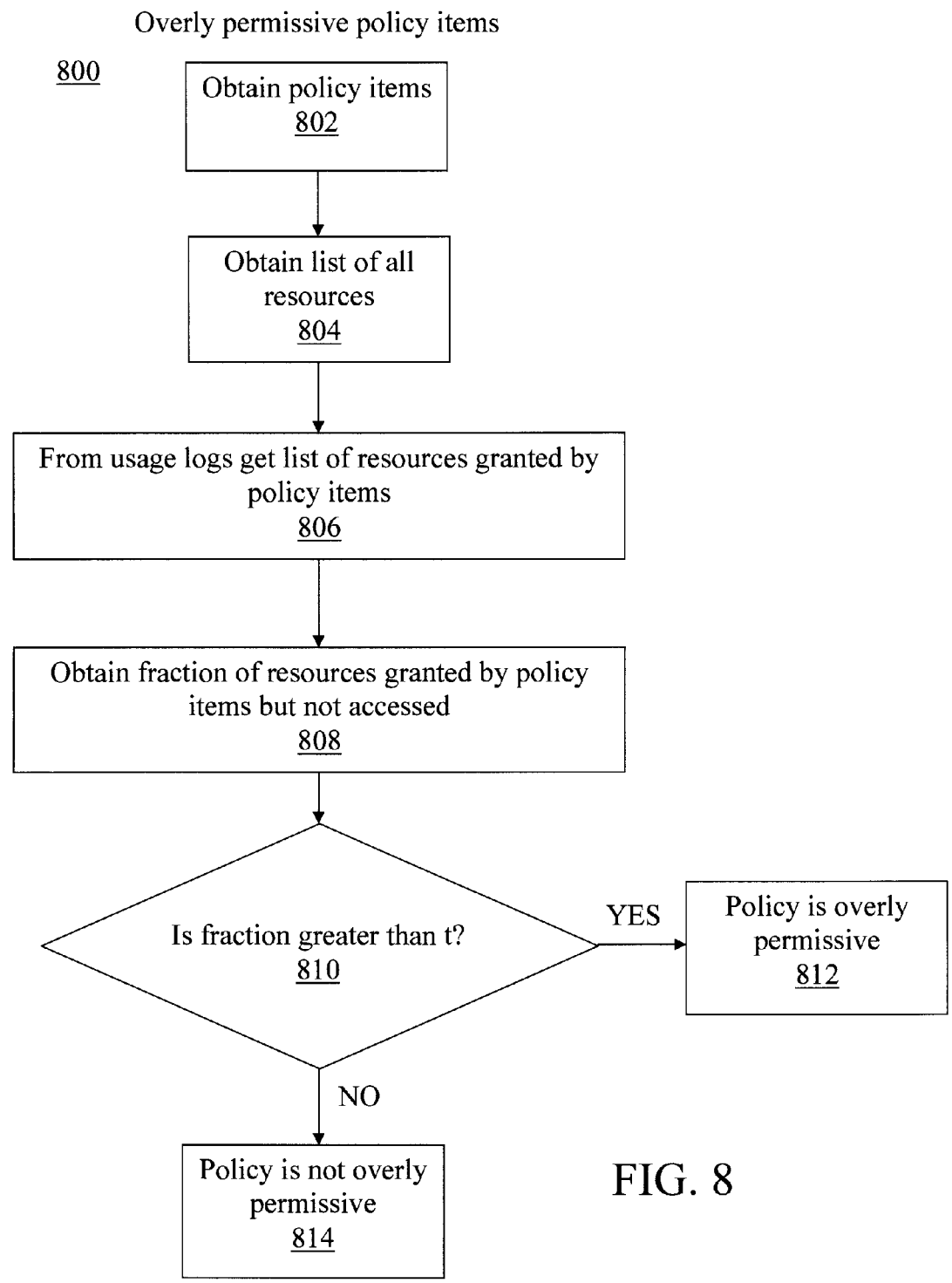
FIG. 8 is a diagram illustrating an exemplary methodology for identifying overly permissive policy items in a security policy based on usage logs according to an embodiment of the present invention.

FIG. 8 is a diagram illustrating an exemplary methodology 800 for identifying overly permissive policy items in a security policy based on usage logs. The details of identifying overly permissive policy items groups were provided above. Methodology 800 provides one exemplary flow of how an evaluation of policy items in a security policy to identify over-permissive items can be carried out. Methodology 800 may be carried out by an apparatus such as apparatus 1000 of FIG. 10.

In step 802, the policy items from the security policy are obtained. In step 804 a list of all of the resources (to which the policy items pertain) is obtained. In step 806, a list of resources granted by the policy items is obtained based on the usage logs. As provided above, the usage logs reflect how the permissions are actually being used.

In step 808, one obtains a fraction of the resources granted by one or more of the policy items but not accessed (by users) and in step 810, a determination is made as to whether the fraction (obtained in step 808) is greater than a threshold t.

If the fraction of the resources granted by one or more of the policy items but not accessed is greater than t, then as per step 812, the policy is considered to be overly permissive. On the other hand if the fraction of the resources granted by one or more of the policy items but not accessed is less than t, then as per step 814, the policy is considered to be not overly permissive.

Figure 9:
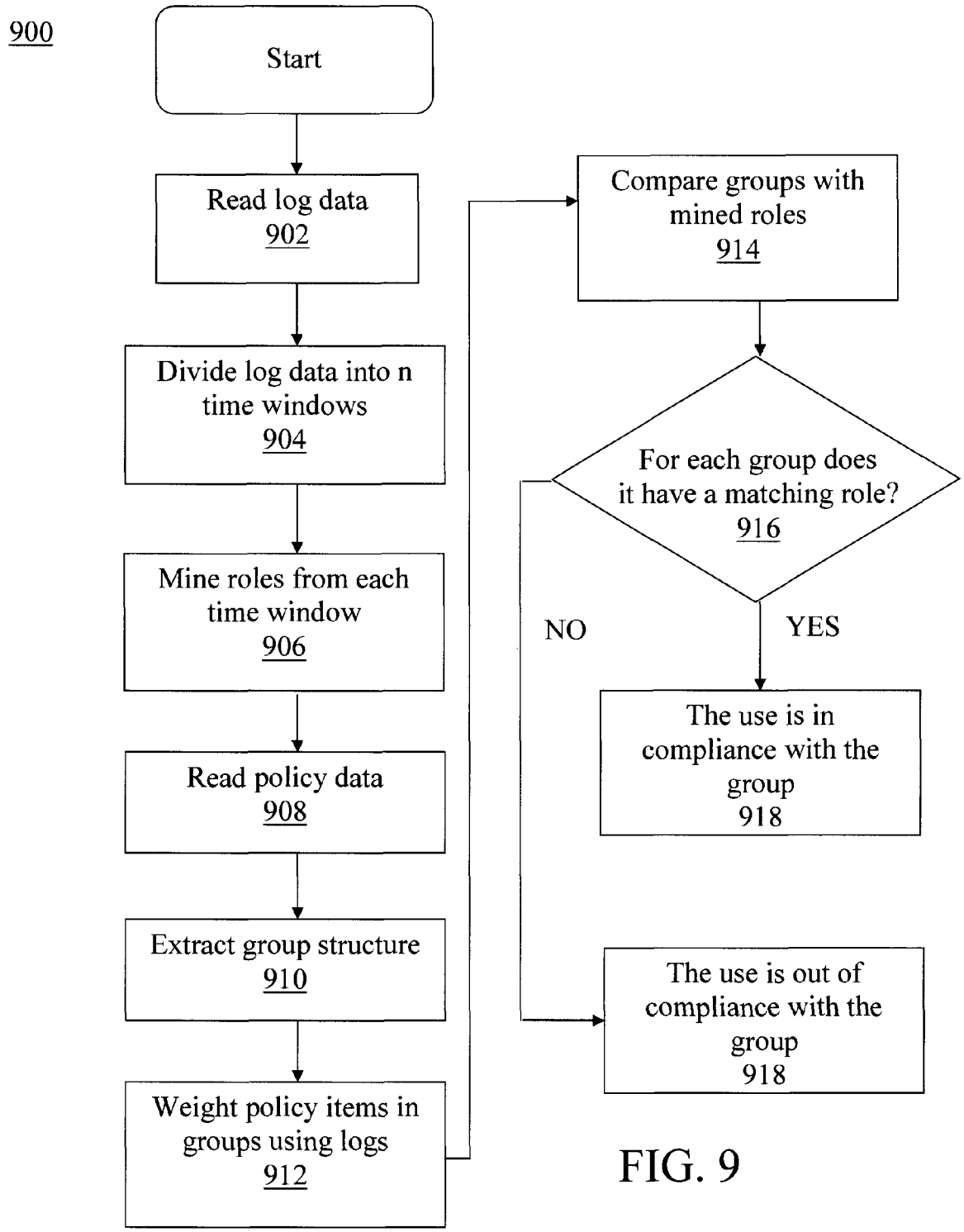
FIG. 9 is a diagram illustrating an exemplary methodology for determining whether groups in the security policy match roles inferred from usage (e.g., using role mining) according to an embodiment of the present invention.

FIG. 9 is a diagram illustrating an exemplary methodology 900 for determining whether groups in the security policy match roles inferred from usage (e.g., using role mining). The details of groups defined in the security policy and roles inferred from usage logs were provided above. Methodology 900 provides one exemplary flow of how to leverage that data to evaluate whether groups (in the security policy) are consistent with inferred roles. Methodology 900 may be carried out by an apparatus such as apparatus 1000 of FIG. 10.

In step 902, usage log data is read. As provided above, the usage logs indicate how the permissions are actually being used.

In step 904, the log data (read in step 902) is divided into n different time windows. This provides a temporally aspect to the analysis. In step 906, the roles are inferred (from the log data) for each of the time windows. As provided above, an exemplary technique for inferring roles in this manner is through role mining.

In step 908, data from the security policy is read. In step 910, the group structure is extracted from the security policy. The group structure defines the individual groups specified in the security policy, as provided above.

In step 912, the policy items in the security policy are weighted using the logs (i.e. so as to indicate, based on actual usage, which of the policy items were used more than others, and vice-a-versa). In step 914, the groups (extracted in step 910) are compared with the inferred (e.g., mined) roles (from step 906) and in step 916 a determination is made, for each group from the security policy, whether the group has a matching role.

If the group has a matching role, then as per step 918, the usage (based on the log data from step 902) is in compliance with the group. On the other hand, if the group does not have a matching role, then as per step 918, the usage is not in compliance with the group.

As provided above, the roles can be mined/inferred for each of multiple time windows n. Thus, methodology 900 may be carried out for different time periods, thus providing a temporal component to the analysis of FIG. 9.

Figure 10:
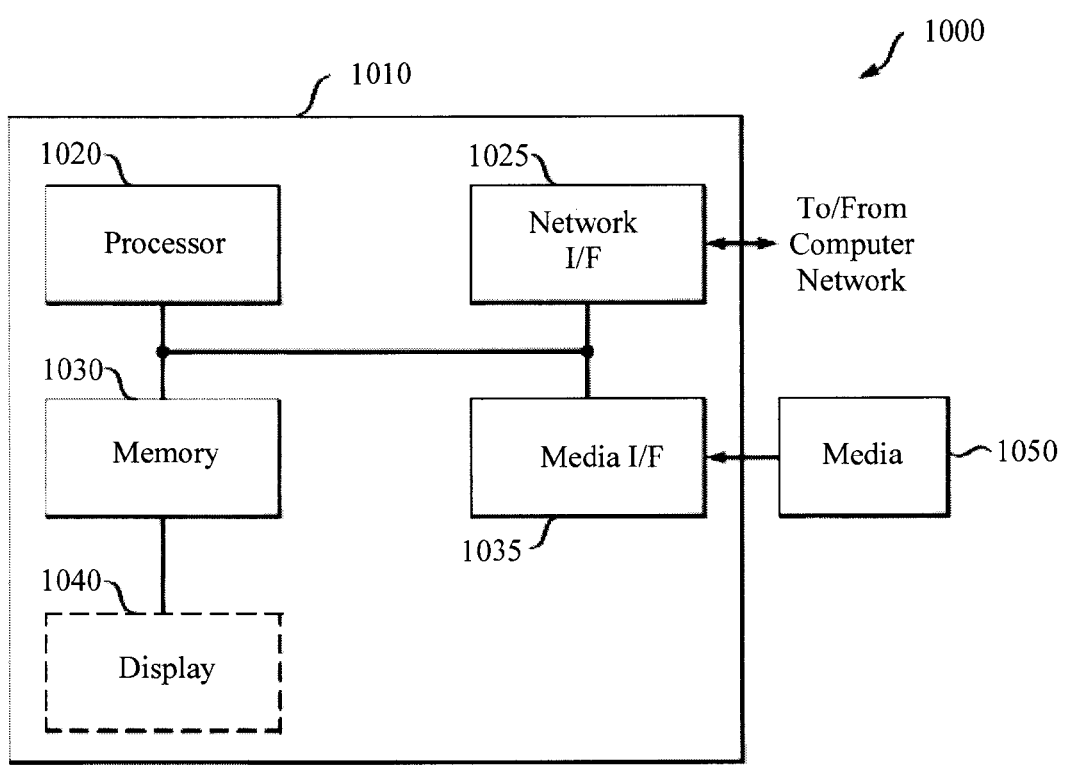
FIG. 10 is a diagram illustrating an exemplary apparatus for performing one or more of the methodologies presented herein according to an embodiment of the present invention.

Turning now to FIG. 10, a block diagram is shown of an apparatus 1000 for implementing one or more of the methodologies presented herein. By way of example only, apparatus 1000 can be configured to implement one or more of the steps of methodology 100 of FIG. 1 for managing a security policy having multiple policy items, methodology 700 of FIG. 7 for identifying over-provisioning (i.e., over-provisioned permissions, users, and groups) in a security policy based on usage logs, methodology 800 of FIG. 8 for identifying overly permissive policy items in a security policy based on usage logs and/or methodology 900 of FIG. 9 for determining whether groups in the security policy match roles inferred from usage (e.g., using role mining).

Apparatus 1000 includes a computer system 1010 and removable media 1050. Computer system 1010 includes a processor device 1020, a network interface 1025, a memory 1030, a media interface 1035 and an optional display 1040. Network interface 1025 allows computer system 1010 to connect to a network, while media interface 1035 allows computer system 1010 to interact with media, such as a hard drive or removable media 1050.

As is known in the art, the methods and apparatus discussed herein may be distributed as an article of manufacture that itself includes a machine-readable medium containing one or more programs which when executed implement embodiments of the present invention. For instance, when apparatus 1000 is configured to implement one or more of the steps of methodology 100 the machine-readable medium may contain a program configured to (a) map permissions to the policy items which apply to usage of the permissions so as to determine which of the permissions are granted to groups of users by each of the policy items; (b) identify at least one of the policy items mapped in step (a) that is in violation of least privilege based on a comparison of an actual permission usage with the security policy; (c) identify at least one of the policy items mapped in step (a) that increases operational risk; (d) verify that policy constructs in the security policy are consistent with policy constructs inferred from the actual permission usage; and (e) identify optimizations of the security policy based on output from one or more of steps (a)-(d).

The machine-readable medium may be a recordable medium (e.g., floppy disks, hard drive, optical disks such as removable media 1050, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 1020 can be configured to implement the methods, steps, and functions disclosed herein. The memory 1030 could be distributed or local and the processor device 1020 could be distributed or singular. The memory 1030 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1020. With this definition, information on a network, accessible through network interface 1025, is still within memory 1030 because the processor device 1020 can retrieve the information from the network. It should be noted that each distributed processor that makes up processor device 1020 generally contains its own addressable memory space. It should also be noted that some or all of computer system 1010 can be incorporated into an application-specific or general-use integrated circuit.

Optional display 1040 is any type of display suitable for interacting with a human user of apparatus 1000. Generally, display 1040 is a computer monitor or other similar display.

In conclusion, a novel approach is provided herein to verify the enforcement of security policies and that usage of permissions meets desired high level goals. Rather than focus on using formalisms to prove desirable properties of the policy, its enforcement, and usage, an analytics based method is provided herein which attempts to ensure that the usage of permissions is consistent with the configured policy and that the configured policy is following the principle of least privilege.

A number of analytic techniques have been proposed herein to achieve this goal. One key analytic is to ensure that the group definitions in the policy correspond to actual roles mined from usage. This analytic measures the relevance of the role definitions as configured in the policy. A number of other techniques geared toward ensuring the configured policy satisfies least-privilege are proposed. These include identifying groups that are: redundant; unused; overly generic; and over provisioned.

The present techniques can be used to narrow a policy to enable just the actions that are necessary, enforcing least privilege and reducing ambiguity to reduce administrative risk. The present techniques are far easier for a security administrator to use than a formal methods-based approach. On the other hand, the instant analytic techniques are far more sophisticated than typical compliance monitoring products which can, at best, only enforce simple compliance conditions.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A computer-implemented method for managing a security policy having multiple policy items, the method comprising the steps of:
   (a) mapping permissions to the policy items which apply to usage of the permissions so as to determine which of the permissions are granted to groups of users by each of the policy items;
   (b) identifying at least one of the policy items mapped in step (a) that is in violation of least privilege based on a comparison of an actual permission usage with the security policy, wherein least privilege specifies that the users are only given privileges that are needed to execute their functions;
   (c) identifying at least one of the policy items mapped in step (a) that increases operational risk;
   (d) verifying that policy constructs in the security policy are consistent with constructs that are inferred from the actual permission usage; and
   (e) identifying optimizations of the security policy based on output from one or more of steps (a)-(d),
   wherein steps (a)-(e) are performed using a hardware processor with memory.

2. The method of claim 1, wherein the step (b) of identifying at least one of the policy items that is in violation of least privilege comprises the step of:
   identifying at least one of the policy items as being redundant, wherein a redundant policy item is a given one of the policy items which specifies an action regarding one or more of the permissions that is also specified by one or more other of the policy items but which have higher priority than the given policy item in an access control decision, and thereby violates least privilege.

3. The method of claim 1, wherein the step (b) of identifying at least one of the policy items that is in violation of least privilege comprises the step of:
   identifying which of the policy items were used to authorize access requests during a given time period and therefore are relevant policy items, and which of the policy items were not used to authorize access requests during the time period, but which do permit access to some resources and are non-relevant policy items in violation of least privilege.

4. The method of claim 1, wherein the step (b) of identifying at least one of the policy items that is in violation of least privilege comprises the step of:
   identifying users who have more than a pre-determined threshold fraction of the permissions which the users either i) do not use, or ii) use less than some pre-determined threshold number of times during a given time period and thus are over-provisioned users in violation of least privilege.

5. The method of claim 4, wherein the over-provisioned users are identified based on logs of the usage of the permissions and the security policy and by measuring a number of the permissions to which each of the users has access but does not use.

6. The method of claim 4, wherein the step (b) of identifying at least one of the policy items that is in violation of least privilege comprises the step of:
   identifying one or more of the groups of users that contain greater than a pre-determined threshold fraction of users in the groups who are over-provisioned users with respect to the permissions assigned to the groups and thus are over-provisioned groups of users in violation of least privilege.

7. The method of claim 6, further comprising the step of:
   determining whether a user in a given one of the groups of users is over-provisioned with respect to the permissions of the group by identifying if the user either i) does not use, or ii) uses less than a pre-determined threshold number of times, more than a pre-determined threshold fraction of the permissions assigned to the given group.

8. The method of claim 7, wherein the over-provisioned groups of users are identified by monitoring how often each of the users in a given one of the groups of users uses a policy item assigned to the users through the particular group to which the users belong.

9. The method of claim 1, wherein the step (b) of identifying at least one of the policy items that is in violation of least privilege comprises the step of:
   identifying a given one of the policy items which is overly permissive in the number of resources to which the given policy item grants access, and thus in violation of least privilege, by determining if more than a first pre-determined threshold fraction of users who are granted access to one or more of the permissions through the given policy item use less than a second pre-determined threshold fraction of the permissions granted by the given policy item within a given period of time.

10. The method of claim 1, wherein the step (c) of identifying at least one of the policy items that increases operational risk comprises the step of:
    tracking changes to the security policy based on logs of the usage of the permissions and the security policy to determine an impact the changes to the security policy have on the usage of the permissions.

11. The method of claim 10, wherein the changes to the security policy comprise revocations of one or more of the permissions from one or more users or one or more of the groups of users, the method further comprising the step of:
  identifying the revocations that are incomplete because one or more of the policy items which subsume the revocation continue to grant access to resource which have been revoked and are therefore incomplete revocations which increase operational risk.

12. The method of claim 11, wherein the changes to the security policy comprise assigning one or more of the permissions to a new user, the method comprising the step of:
  determining whether the new user has attributes which are similar to existing users who have already been assigned the permissions being granted to the new user.

13. The method of claim 12, further comprising the steps of:
  using an aggregate distance function to determine a similarity in attributes between the new user and the existing users; and
  determining based on the aggregate distance function if (A) a distance for any single attribute exceeds a given threshold t; (B) an aggregate distance exceeds the threshold t; or (C) at least n of the attributes are not within the threshold t, wherein if any one of (A)-(C) are true then the new user is considered to be dissimilar to the existing users and assigning the one or more permissions to the new user will increase operational risk.

14. The method of claim 1, wherein the step (d) of verifying that the policy constructs in the security policy are consistent with the constructs that are inferred from the actual permission usage comprises the step of:
  comparing groups and roles in the policy constructs in the security policy with roles inferred from the actual permission usage to determine an amount by which the groups and roles in the security policy and the roles inferred from the actual permission usage differ.

15. The method of claim 14, wherein the roles are inferred from the actual permission usage using role mining.

16. The method of claim 14, wherein the amount by which the groups and roles in the security policy and the roles inferred from the actual permission usage differ is determined by computing an aggregate root mean square error (RMSE) for a vector-wise comparison given an optimal role mapping between the groups and roles in the security policy with the roles inferred from the actual permission usage.

17. The method of claim 14, wherein the groups and roles in the security policy that differ from the roles inferred from the actual permission usage by an amount that is greater than a pre-determined threshold are marked as an non-compliant groups and roles.

18. The method of claim 2, wherein the step (e) of identifying optimizations of the security policy comprises the step of:
  eliminating the policy items identified as being redundant.

19. The method of claim 3, wherein the step (e) of identifying optimizations of the security policy comprises the step of:
  eliminating the non-relevant policy items.

20. The method of claim 4, wherein the step (e) of identifying optimizations of the security policy comprises the step of:
  revoking the permissions that the over-provisioned users have that the over-provisioned users i) do not use, or ii) use less than the pre-determined threshold number of times during the given time period.

21. The method of claim 7, where in the step (e) of identifying optimizations of the security policy comprises the step of:
  removing the users from the over-provisioned groups of users that are over-provisioned with respect to the permissions of the group.

22. The method of claim 6, where in the step (e) of identifying optimizations of the security policy comprises the step of:
  revoking any of the permissions from the over-provisioned groups of users that are not used by a pre-determined fraction of the users in the over-provisioned groups.

23. The method of claim 9, where in the step (e) of identifying optimizations of the security policy comprises the step of:
  rewriting each of the policy items which are identified as being overly permissive to only apply to a minimal set of permissions that are actually accessed in a given period of time.

24. The method of claim 11, where in the step (e) of identifying optimizations of the security policy comprises the step of:
  revoking all of the policy items which apply to same permissions as the incomplete revocations.

25. The method of claim 17, where in the step (e) of identifying optimizations of the security policy comprises the steps of:
  eliminating the groups and roles from the security policy that differ from the roles inferred from the actual permission usage by the amount that is greater than the pre-determined threshold; and
  for the roles inferred from the actual permission usage that differ from the groups and roles from the security policy by the amount that is greater than the pre-determined threshold, creating a new group in the security policy with a same group of users and permissions as the roles inferred from the actual permission usage.

* * * * *